(12) United States Patent
Boyer et al.

(10) Patent No.: US 6,772,954 B2
(45) Date of Patent: Aug. 10, 2004

(54) METHOD OF ENCODING INFORMATION WITHIN DIRECTORY FILES ON AN INTEGRATED CIRCUIT SMART CARD

(75) Inventors: John Boyer, Ottawa (CA); Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 33 days.

(21) Appl. No.: 09/972,155

(22) Filed: Oct. 9, 2001

(65) Prior Publication Data

US 2003/0066894 A1 Apr. 10, 2003

(51) Int. Cl.$^7$ .............................................. G06K 19/06
(52) U.S. Cl. ...................... 235/492; 235/487; 235/380; 235/375; 711/170; 711/173
(58) Field of Search .................................. 235/492, 487, 235/380, 375; 711/170, 173, 201

(56) References Cited

U.S. PATENT DOCUMENTS

| | | | |
|---|---|---|---|
| 4,985,615 A | | 1/1991 | Iijima |
| 5,161,256 A | | 11/1992 | Iijima |
| 5,848,419 A | * | 12/1998 | Hapner et al. ............... 707/100 |
| 5,860,135 A | * | 1/1999 | Sugita ........................ 711/115 |
| 5,920,869 A | * | 7/1999 | Wakayama et al. ............ 707/1 |
| 6,141,055 A | * | 10/2000 | Li .............................. 348/446 |
| 6,154,823 A | * | 11/2000 | Benayon et al. ............ 711/170 |
| 6,283,369 B1 | * | 9/2001 | Kurokawa et al. .......... 235/380 |
| 6,441,290 B2 | * | 8/2002 | Fujita et al. .................. 84/603 |

FOREIGN PATENT DOCUMENTS

WO        WO 00/69183 A2    11/2000

OTHER PUBLICATIONS

APL with Extended Workforce, IBM Technical Disclosure Bulletin, Oct. 1978, US (2 pages).*
M. Nyström, "PKCS #15—A Cryptographic Token Information Format Standard", USENIX Workshop on Smartcard Technology, May 10–11, 1999, Chicago, Illinois, USA.
"pkcs#15v1.0: Cryptographic Token Information Format Standard" RSA Laboratories, A Division of RSA Data Securities, XP002238442, pp. 1–80, Apr. 23, 1999.

* cited by examiner

*Primary Examiner*—Michael G. Lee
*Assistant Examiner*—Steven S. Paik
(74) *Attorney, Agent, or Firm*—Freedman & Associates

(57) ABSTRACT

An improved method of encoding data within directory files on an integrated circuit IC) smart card is shown. Advantageously the improved method no longer imposes a limitation in placing the pointer data start address prior to encoding of data, since after encoding a single continuous block of unused memory within the directory file results, enables encoding applications to make better use of this memory space thereby eliminating the deficiency of having two non-sequential empty memory blocks as provided by prior art systems.

16 Claims, 2 Drawing Sheets

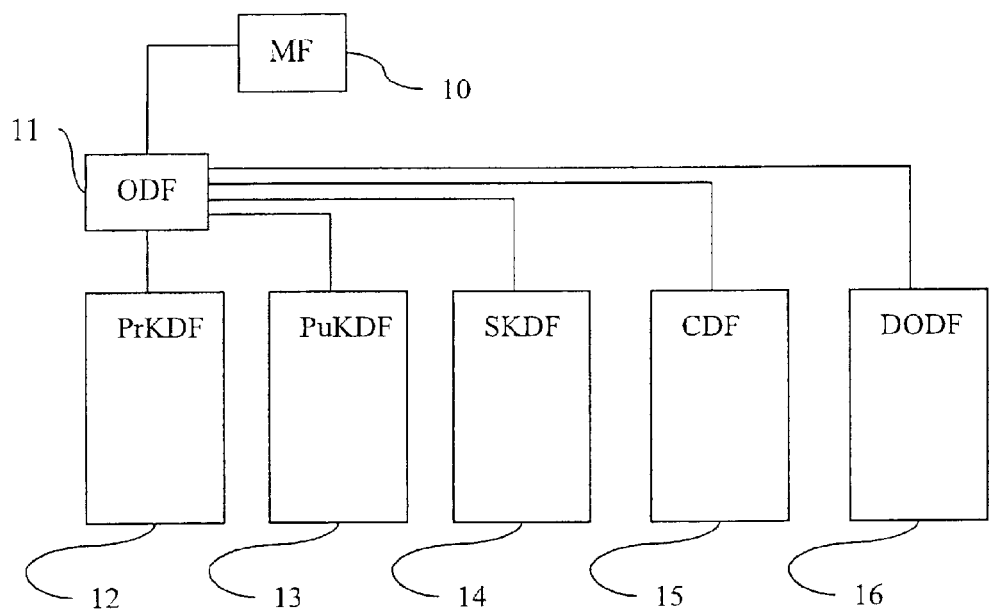
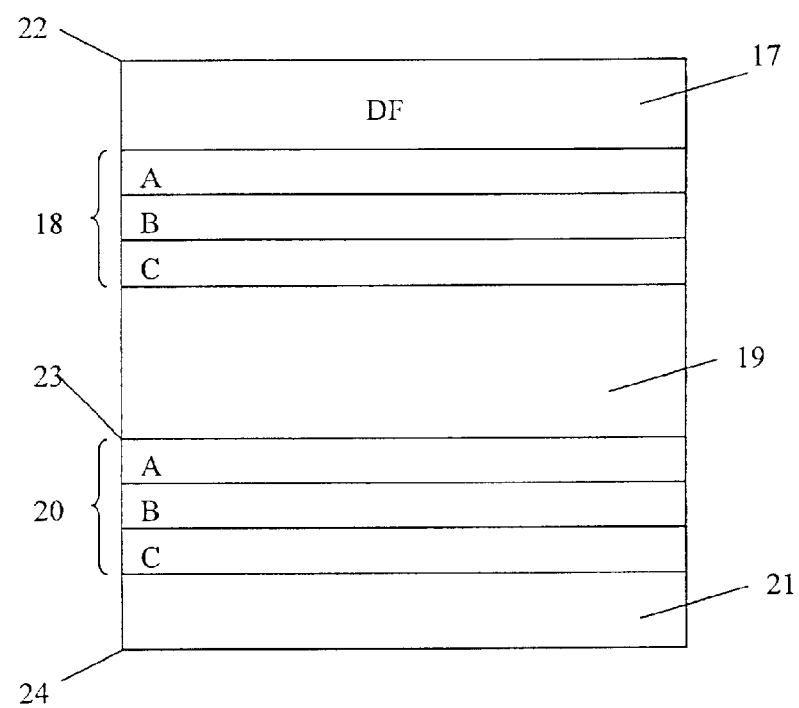
Fig. 1    (Prior Art)

METHOD OF ENCODING INFORMATION WITHIN DIRECTORY FILES ON AN INTEGRATED CIRCUIT SMART CARD

FIELD OF THE INVENTION

This invention relates to an improved method of encoding data within an integrated circuit (IC) card and more specifically to an improved method of encoding data within directory files contained within a PKCS15 is compatible integrated circuit (IC) smart card.

BACKGROUND OF THE INVENTION

Smart card (SC) technology has allowed for storing of secure information within an integrated circuit card. The secure information is stored in such a format that software keys and certificates are required for authentication purposes before information is retrieved. An encoding standard, known as PKCS15 dictates how these keys and certificates are represented in terms of smart card files and directories. The format securely controls external access to files and directories on the smart card during the process of encoding information, or reading information from the smart card.

The PKCS15 compatible format for a smart card is documented in "PKCS #15 v1.1: Cryptographic Token Information Syntax Standard", RSA Laboratories, Dec. 21, 1999 and incorporated herein by reference. Each smart card must contain an Object Directory File (ODF). This file contains pointers to other directory files, of which, for example when storing cryptographic keys, some are a Private Key Directory File (PrKDF), a Public Key Directory File (PuKDF), a Secret Key Directory File (SKDF), a Certificate Directory File (CDF), and a Data Object Directory File (DODF).

A Private Key Directory File is regarded as a directory of private key identifiers known to the PKCS15 application and typically stores one private key. At least one PrKDF must be present on the smart card containing private keys. In some cases this private key directory file contains cross-reference pointers to authentication objects used to protect access to keys that reside anywhere on the card. If there are private keys corresponding to public keys also residing on the card then the public keys are stored within a Public Key Directory File (PuKDF). Wherein the public keys and the private keys share the same identifier on the card.

At lease one Secret Key Directory File (SKDF) must be present on a smart card containing secret keys. This SKDF contains general key attributes such as labels and identifiers. In some cases the SKDF also contains cross-reference pointers to authentication objects used to protect access to the keys. A Certificate Directory File (CDF) is regarded as a directory of certificates known to the PKCS15 application and at least one CDF must be present on a smart card. The CDF contains certificates or references to certificates. A Data Object Directory File (DODF) is regarded as a directory of data objects other than keys or certificates. At least one DODF must be present on a smart card containing such data objects. These files contain general data object attributes such as identifiers of the application to which the data object belongs and also pointers to the data objects themselves.

Each of the directory files: Private Key, Public Key, Secret Key, Certificate or Data Object, occupy a non volatile array of addressable memory within the smart card. In the prior art method of encoding, pointer addresses are stored in proximity of a starting address of memory allocated to the smart card directory file, and pointer data stored at a fixed pointer data start address within the memory allocated to the smart card directory file. Unfortunately, after the encoding process two non-continuous blocks of unused memory within directory file result due to the placement of the pointer data start address.

It is therefore an object of this invention to provide an improved method of encoding information within smart card directory files such that a single block of unused memory is available within the smart card directory file after encoding and the improved method allowing for downwards compatibility with PKCS15 compatible application.

SUMMARY OF THE INVENTION

In accordance with the invention there is provided a method of encoding information within non-volatile memory of a smart card comprising the steps of:

providing a directory file having a start address and an end address within non-volatile storage of a smart card;

providing a data object for storage within the smart card;

storing the data object in at least a last available memory location within the directory file, the last available memory location nearer a start address of the directory file than an earlier stored data object; and storing pointer data in at least a first available memory location most proximate the start address and between the start address and the end address, the pointer data indicative of a data object location.

In accordance with another aspect of the invention there is provided a method of encoding information within non-volatile memory of a smart card comprising the steps of:

providing a directory file having a start address and an end address within non-volatile storage of a smart card;

providing a data object for storage within the smart card;

storing the data object in at least an available memory location proximate the last available memory location within the directory file, the last available memory location nearer a start address of the directory file than an earlier stored data object; and storing pointer data in at least an available memory location proximate the start address and between the start address and the end address, the pointer data indicative of a data object location.

In accordance with yet another aspect of the invention there is provided a smart card comprising:

a directory file having a start address and an end address within non-volatile storage of a smart card;

a data object stored within the directory file and between the start address and the end address;

pointer data associated with the data object stored within the directory file and between the start address and the end address; and, a continuous block of available memory between the last stored pointer data and the data object location indicated by the last stored pointer data, the continuous block of available memory for storing therein of pointer data and data objects.

BRIEF DESCRIPTION OF THE DRAWINGS

The invention will now be described with reference to the drawings in which:

FIG. 1, is a prior art diagram of directory files within a IC smart card as well as a prior art method of encoding data within the smart card.

DETAILED DESCRIPTION OF THE INVENTION

Figure 2:
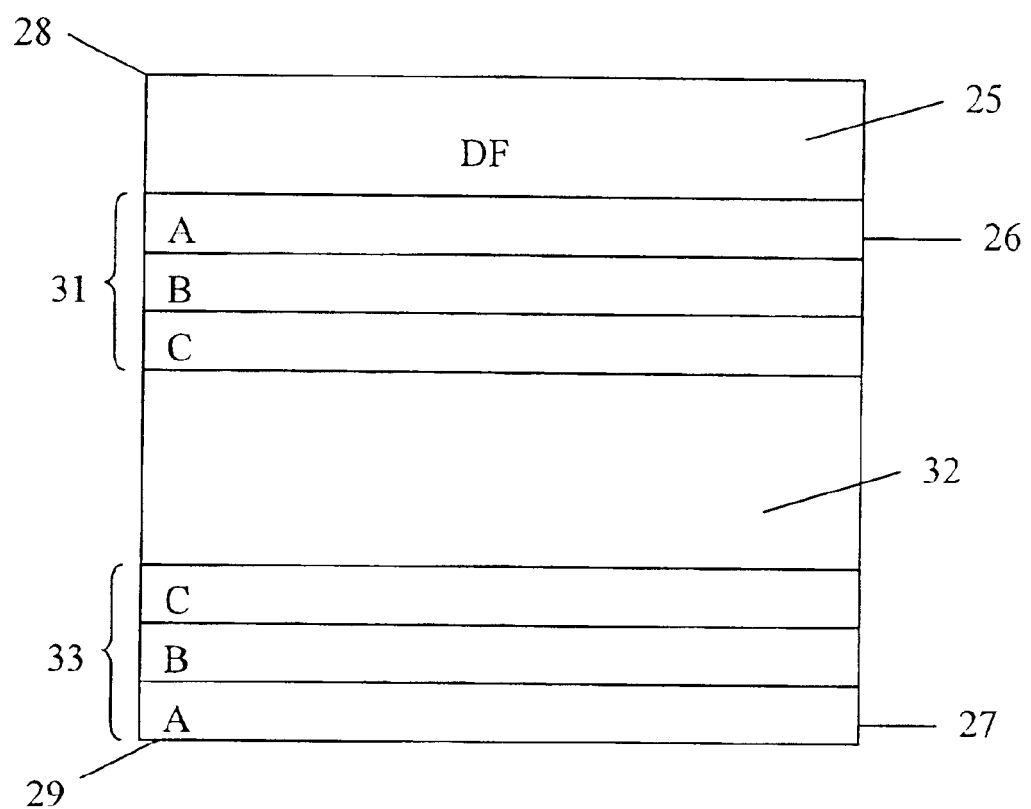
FIG. 2, illustrates an improved method of encoding data within a smart card resulting in a single continuous block of free memory.

In prior art FIG. 1, a PKCS15 compatible integrated circuit smart card (SC) is shown. The smart card comprises of a Master Directory File (MF) 10, with a pointer to an Object Directory File (ODF) 11. The ODF 11 contains pointers to data directory files stored on the smart card, namely a Private Key Directory File (PrKDF) 12, Public Key Directory File (PuKDF) 13, Secret Key Directory Files (SKDF) 14, Certificate Directory File (CDF) 15, and Data Object Directory File (DODF) 16. Memory provided to each of these directory files is non-volatile, byte addressable, having a start address 22 and an end address 24.

Memory for each data directory file 17 comprises of a pointer memory space 18 and a pointer data memory space 20. The pointer memory space 18 is reserved for encoding pointer addresses, and the pointer data memory space 20 reserved for encoding pointer data. Information space within memory in proximity of the smart card start address 22 is reserved for pointers 18. Information space within the memory in proximity of a pointer data start address 23 is reserved for pointer data 20. The pointer data 20 entries are referenced by a corresponding pointer 18, so for instance the pointer stored in pointer memory space "A" references a memory address corresponding to pointer data "A" stored in the pointer data memory. In this manner any references made to the pointer data "A" are indexed within the pointer memory by pointer "A".

Pointers are sequentially encoded into the pointer memory space 18 starting in proximity of the memory start address 22, and pointer data is encoded starting at the pointer data start address 23. As information is encoded into the smart card directory file memory 17 the amount of unused memory decreases, resulting in two separate blocks of memory having no data contained therein. A first block of memory 19 having no data contained therein is located between the last pointer entry, entry "C", written into the pointer memory space 18 and the pointer data start address 23. A second block of memory 21 having no data contained therein is located between the last pointer data entry "C", written into the pointer data memory space 20, and the memory end address 24. The result is two unused memory blocks having no data contained therein. Of course, it is understood that the unused memory is being reserved for future uses when more data is stored.

A location of the pointer data start address 23 is a design issue for each of the data directory files 17 in order to make the best use of the memory available to the directory file. During encoding of information within the directory file 17 the prior art encoding method limits the encoding to a fixed number of pointers or to a fixed amount of pointer data, which must be predetermined before encoding, due to the placement of the pointer data start address prior to encoding. In either case this results in two non-sequential blocks of memory within the directory file 17 having no data encoded therein.

In designing the memory storage map for a smart card compliant with PKCS15, there are competing concerns. These are illustrated by way of example. When storing private keys in a data area, space allocated to pointers is based on a theoretical maximum number of keys. When all keys are identical in configuration, a simple mathematical calculation allows for a determination of the pointer data start address 23. Here, the memory available divided by the memory required for each key object plus the memory required for each pointer determines the maximum number of keys that can be stored. This also determines the location of the pointer data start address 23 which is at least the maximum number of pointers multiplied by the amount of space each pointer requires from the beginning of the data directory file. Unfortunately, when more than one key size is supported, the calculation is not so simple. Either the maximum number of keys is supported—memory usage is optimized only when all keys are of a same smallest key size—or fewer keys are supported such that there is a potential that pointer space will run out before data object space. Of course, in the first instance, storing of larger keys results in unused pointer locations.

Problematically, because the PKCS15 standard is already widely implemented and accepted, it is difficult at present to redesign the data storage within a smart card. Improving a flawed standard requires acceptance by the standards body and its participants. This is an onerous task that sometimes requires years to achieve. An alternative to such an approach is to design a backwards-compatible improved storage system. Unfortunately, such an approach severely restricts available design options and is often futile.

A backwards-compatible improved storage system must be such that reading thereof functions on any PKCS15 compliant smart card reading device. Writing of the smart cards need not follow the PKCS15 standard exactly, as long as the data is retrievable by PKCS15 systems.

One such improvement over the prior art method of encoding data within the smart card is shown in FIG. 2. In FIG. 2, a single directory file (DF) 25 is shown. The memory provided to the directory file has a start address 28 and an end address 29. Within each data directory file there is a pointer memory space 31 and an object data memory space 33. The pointer memory space 31 is reserved for storing pointer addresses, and the object data memory space 33 reserved for storing pointer data. Space within memory in proximity of the start address 28 is reserved for storing pointers 31. Space within the memory in proximity of the end address 29 is reserved for pointer data 27. The object data entries are referenced by a corresponding pointer 26, so for instance the pointer stored in pointer memory space "A" references the address of corresponding pointer data "A" stored in the pointer memory data space. In this manner any references made to the pointer data "A" are referenced to within the pointer memory space by pointer "A".

Pointers are sequentially written into the pointer memory space starting in proximity of the start address 28 and progressing towards the end address 29. Therefore in the pointer memory space 31, pointer "A" is at a lower address than pointer "B". Object data on the other hand is encoded in a converse manner. The first set of object data 33 corresponding to pointer "A" is encoded starting in proximity of the memory end address 29, where data is sequentially written from a higher address to a lower address—from an end of the data object to a beginning such that the data object remains in a same order compatible with PKCS15. Therefore, in the pointer data memory space, pointer data "A" is at a higher address than pointer data "B".

A pointer data start address 23 is not provided since the object data starts at the memory end address 29 and progresses towards the memory start address 28. Though data storage is described in this fashion, typically, objects are written in the same forward direction as currently employed by PKCS15 systems. The object start locations are determined based on object size and a last available data location such that the objects are placed at the end of the available data space.

Encoding data within the directory file 25 in this manner results in a single block of unused memory 32 having no data contained therein. This single unused block of memory 32 is located between the last encoded pointer located within the pointer memory space 31 and the last set of encoded object data located within the object data memory space 33.

As a result, there is no longer a limitation in placing the pointer data start address 23, since it is no longer required, as well as no longer wasting storage space due to insufficient space in only one of the two memory areas—pointer data and object data. This single continuous block of unused memory 32 within the directory file enables encoding applications to make better use of this memory space contained within the directory file, eliminating the non-sequential empty memory space within the directory file.

Advantageously this format is backwards compatible with PKCS15 reading and encoding processes because the pointers within the pointer memory space still address the corresponding information stored within the pointer data memory space. With the improved method more information can be encoded within each directory file since the improved method of encoding facilitates improved memory management within the directory file.

For example the total amount of non-volatile memory allocated to the DODF is 100 bytes. The data objects stored in the DODF are either 19 bytes, or 39 bytes in length. If there are five data pointers to data objects stored within the DODF and five 19 byte data objects stored within the DODF then the total space of 100 bytes within the DODF is utilized effectively in the prior art system. If for instance there are three data pointers to data objects, a 19 byte data object and two 39 byte data object stored within the DODF then again then the total space of 100 bytes within the DODF is utilized effectively in the prior art system. In the prior art if the number of pointers to data objects within the DODF is fixed to five upon initialization of the directory file, then only five 19 byte data objects are written into the DODF, or one 39 byte data object and two 19 byte data objects, which leaves 18 bytes of unused data within the directory file with no data written to therein, since the data objects are minimum 19 bytes in size. However according to the present invention, the limitation in the amount of pointer space would not be present since the pointer data space and object data space share the same continuous piece of memory within the DODF. Advantageously in the invention if the size of the data object needs to be changed then the data object can be custom tailored to suit the exact amount of free memory within the DODF since the pointer data and data objects share the same memory space.

Numerous other embodiments may be envisaged without departing from the spirit or scope of the invention.

What is claimed is:

1. A method of encoding information within non-volatile memory of a smart card comprising the steps of;
   providing a directory file having a start address and an end address within non-volatile storage of a smart card, the smart card supporting retrieval of data objects in accordance with the PKCS15 standard;
   providing a data object for storage within the smart card;
   storing the data object in at least a last available memory location within the directory file, the last available memory location nearer the start address of the directory file than an earlier stored data object; and
   storing pointer data in at least a first available memory location most proximate the start address and between the start address and the end address, the pointer data indicative of a data object location.

2. A method according to claim 1, wherein application of the method results in a continuous block of available memory between the last stored pointer data and the data object location indicated by the last stored pointer data.

3. A method according to claim 2, wherein the pointer data includes an address determined by subtracting the data object size from the last available memory location address.

4. A method according to claim 3, wherein the last available memory location address is determined as the address within th last pointer data minus one address location.

5. A method according to claim 1, wherein the memory start address is lower than the memory end address.

6. A method according to claim 1, wherein the memory start address is higher than the memory end address and wherein a forward direction in memory is from higher address values toward lower address values.

7. A method of encoding information within non-volatile memory of a smart card comprising the steps of:
   providing a directory file having a start address and an end address within non-volatile storage of a smart card, the smart card supporting retrieval of data objects in accordance with the PKCS15 standard;
   providing a data object for storage within the smart card;
   storing the data object in at least an available memory location proximate the last available memory location within the directory file, the last available memory location nearer the start address of the directory file than an earlier stored data object; and
   storing pointer data in at least an available memory location proximate the start address and between the start address and the end address, the pointer data indicative of a data object location.

8. A method according to claim 7, wherein application of the method results in a continuous block of available memory between the last stored pointer data and the data object location indicated by the last stored pointer data.

9. A method according to claim 8, wherein the pointer data includes an address determined by subtracting the data object size from the last available memory location address.

10. A method according to claim 9, wherein the last available memory location address is determined as the address within the last pointer data minus one address location.

11. A method according to claim 7, wherein the memory start address is lower than the memory end address.

12. A method according to claim 7, wherein the memory start address is higher than the memory end address and wherein a forward direction in memory is from higher address values toward lower address values.

13. A smart card comprising:
   a directory file having a start address and an end address within non-volatile storage of a smart card;
   a data object stored within the directory file and between the start address and the end address; pointer data associated with the data object stored within the directory file and between the start address and the end address; and,
   a continuous block of available memory between the last stored pointer data and the data object location indicated by the last stored pointer data, the continuous block of available memory for storing therein of pointer data and data objects, the smart card supporting retrieval of data objects in accordance with the PKCS15 standard.

14. A smart card according to claim 13, wherein:

the data object is stored in at least a last available memory location within the directory file; and the associated data pointer is stored in at least a first available memory location most proximate the start address and between the start address and the end address.

15. A smart card according to claim 13, wherein:

a plurality of data objects are stored in a contiguous block of memory including at least a last available memory location within the directory file; and a plurality of associated data pointers are stored in a contiguous block of memory including at least a first available memory location most proximate the start address and between the start address and the end address.

16. A smart card according to claim 13, wherein:

a plurality of data objects are stored in a contiguous block of memory including a memory location near the last available memory location within the directory file; and a plurality of associated data pointers are stored in a contiguous block of memory including a memory location near at least a first available memory location most proximate the start address and between the start address and the end address.

* * * * *